US010397420B2

(12) United States Patent
Oizumi et al.

(10) Patent No.: US 10,397,420 B2
(45) Date of Patent: Aug. 27, 2019

(54) MEDIUM PROCESSING DEVICE

(71) Applicant: SEIKO EPSON CORPORATION, Tokyo (JP)

(72) Inventors: Takao Oizumi, Nagano (JP); Yoshihisa Saka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/909,060

(22) Filed: Mar. 1, 2018

(65) Prior Publication Data

US 2018/0278775 A1    Sep. 27, 2018

(30) Foreign Application Priority Data

Mar. 27, 2017 (JP) ................. 2017-061368

(51) Int. Cl.
| | | |
|---|---|---|
| *H04N 1/00* | (2006.01) | |
| *B65H 3/06* | (2006.01) | |
| *B65H 7/02* | (2006.01) | |

(52) U.S. Cl.
CPC ....... *H04N 1/00602* (2013.01); *B65H 3/0669* (2013.01); *B65H 3/0684* (2013.01); *B65H 7/02* (2013.01); *B65H 2402/46* (2013.01); *B65H 2403/481* (2013.01); *B65H 2403/724* (2013.01); *B65H 2513/41* (2013.01); *B65H 2513/50* (2013.01); *B65H 2515/32* (2013.01); *H04N 2201/0094* (2013.01)

(58) Field of Classification Search
CPC ....... H04N 1/00602; H04N 2201/0094; B65H 3/0669; B65H 3/0684; B65H 7/02; B65H 2403/481; B65H 2402/46; B65H 2403/724; B65H 2513/41; B65H 2513/50; B65H 2515/32
USPC ........................................................ 358/498
See application file for complete search history.

(56) References Cited

U.S. PATENT DOCUMENTS

| | | | | |
|---|---|---|---|---|
| 4,792,827 A | * | 12/1988 | Ogura | G03G 15/55 340/286.13 |
| 5,100,123 A | * | 3/1992 | Kagiura | B65H 1/04 271/127 |
| 2005/0218584 A1 | * | 10/2005 | Dan | B65H 3/0669 271/127 |
| 2014/0138901 A1 | * | 5/2014 | Takahata | B65H 5/26 271/3.19 |

(Continued)

FOREIGN PATENT DOCUMENTS

| | | |
|---|---|---|
| JP | 2011-083913 A | 4/2011 |
| JP | 2012-090007 A | 5/2012 |

*Primary Examiner* — Allen H Nguyen

(57) ABSTRACT

A medium processing device includes a processor, a feed roller, a motor, a motive force transmission gear that transmits motive force of the motor to the feed roller, a switching unit that is configured including a main gear and a sub gear that meshes with the main gear and moves in planetary motion around the main gear, and that switches accompanying rotation direction switching of the main gear between a meshed state and a disengaged state between the sub gear and the motive force transmission gear, a load detection unit that detects load of the motor, and a controller. The controller controls the motor and the processor according to the load detected by the load detection unit at switching of the sub gear from the disengaged state to the meshed state.

12 Claims, 11 Drawing Sheets

(56) References Cited

U.S. PATENT DOCUMENTS

| | | | |
|---|---|---|---|
| 2015/0090563 A1* | 4/2015 | Uesugi | B65G 13/06 |
| | | | 198/791 |
| 2016/0159590 A1* | 6/2016 | Zensai | B65H 3/0684 |
| | | | 271/118 |
| 2016/0170362 A1* | 6/2016 | Ye | G03G 15/6529 |
| | | | 271/10.13 |

* cited by examiner

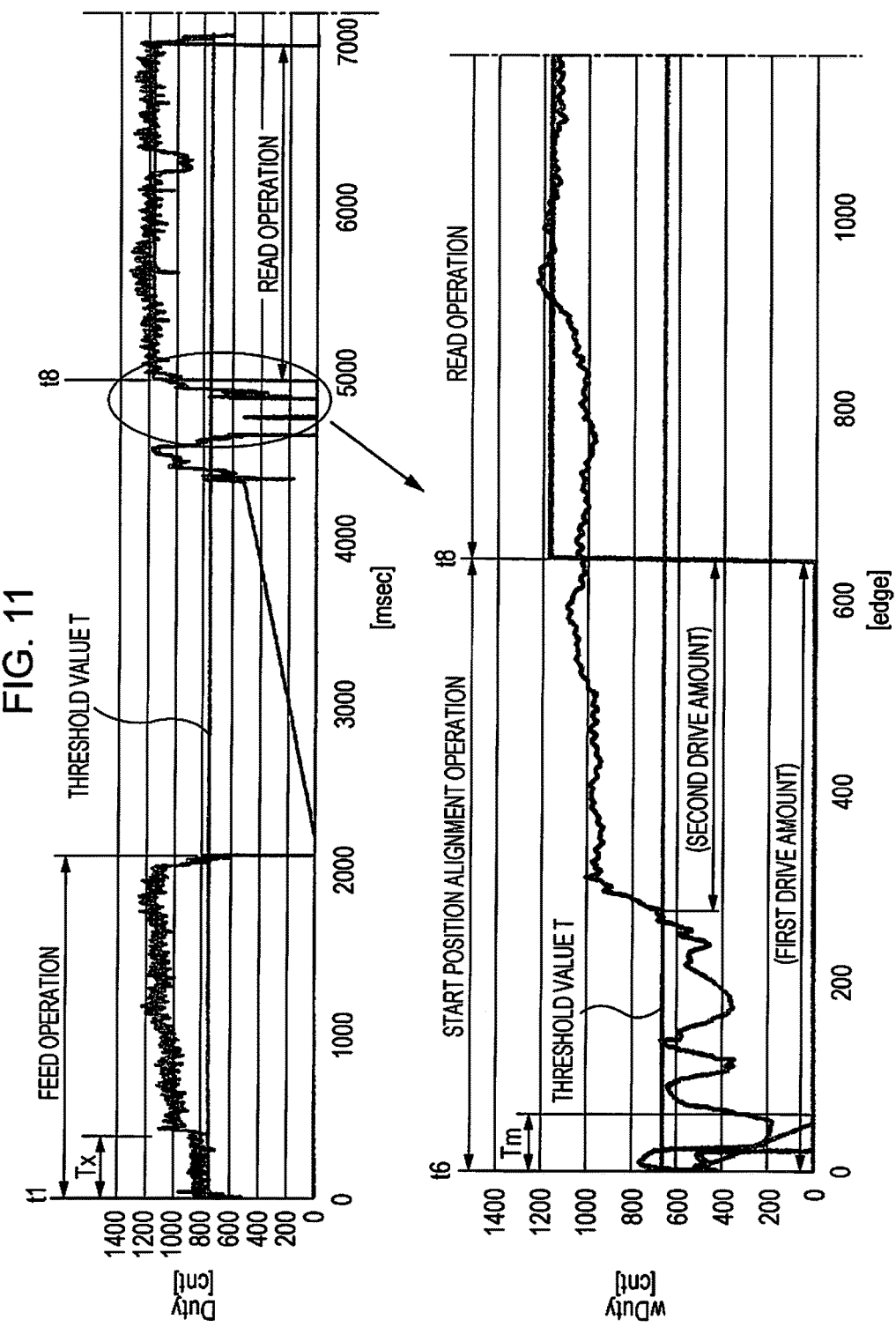

MEDIUM PROCESSING DEVICE

CROSS REFERENCE TO RELATED APPLICATION

The entire disclosure of Japanese Patent Application No. 2017-061368, filed Mar. 27, 2017 is expressly incorporated by reference herein.

BACKGROUND

1. Technical Field

The disclosure relates a medium processing device, such as a scanner or printer, that performs processing on a medium.

2. Related Art

Devices such as scanners and printers are sometimes provided with a planetary gear mechanism that switches motive force transmission states between a motor and a driven component driven by the motor. JP-A-2012-090007 describes an example of a configuration employing a planetary gear to switch drive states in an Auto Document Feeder (ADF).

For example, in configurations in which a source document is fed to a reader section of a scanner, in cases in which meshing of a planetary gear is switched accompanying drive of a source document feed roller, when a planetary gear and a counterpart gear mesh with each other, sometimes leading ends of the teeth of the two gears abut and do not transition to a meshed state quickly. In such cases, the distance by which the source document advances is shorter than that intended for the drive amount of the motor. As a result, reading starts regardless of the fact that the source document has not reached the reader section, raising concerns of an issue of being unable to obtain the desired reading results.

SUMMARY

An advantage of some aspects of the disclosure is that more appropriate processing results are obtained in a medium processing device including a motive force switching unit that switches between motive force transmission states of a motor using a planetary gear mechanism.

A medium processing device according to a first aspect of the disclosure includes a processor, a feed roller, a motor, a motive force transmission gear, a motive force switching unit, a load detection unit, and a controller. The processor performs processing on a medium. The feed roller feeds the medium to the processor. The motor is a drive source of the feed roller. The motive force transmission gear is one gear to transmit motive force of the motor to the feed roller. The motive force switching unit is configured including a main gear and a sub gear. The main gear is driven by the motor, and the sub gear meshes with the main gear and moves in planetary motion around the main gear. The motive force switching unit is configured capable of switching accompanying rotation direction switching of the main gear, between a meshed state in which the sub gear is meshed with the motive force transmission gear and a disengaged state in which the sub gear is disengaged from the motive force transmission gear. The load detection unit detects load of the motor. The controller controls the motor and the processor, the controller controlling at least one out of the motor or the processor according to load of the motor detected by the load detection unit at switching of the sub gear from the disengaged state to the meshed state.

According to this aspect, the controller determines the meshed state of the sub gear with the motive force transmission gear to be present according to the load of the motor. Based on this determination, the controller controls at least one out of the motor or the processor. By detecting meshing of the respective gears and controlling on this basis, more appropriate processing results can be obtained even in cases in which meshing between the gears (meshing between the sub gear and the motive force transmission gear) is not performed smoothly when the sub gear switches from the disengaged state to the meshed state.

Configuration may be made further including a threshold value for load of the motor, wherein the controller transitions to control performed when the sub gear has switched to the meshed state based on the load of the motor having exceeded the threshold value.

This configuration further includes the threshold value for the load of the motor. The controller transitions to the control performed when the sub gear has switched to the meshed state based on the load of the motor having exceeded the threshold value. This thereby enables the load of the motor to be more appropriately assessed, enabling more appropriate processing results to be obtained.

Configuration may be made wherein the controller takes the load of the motor detected by the load detection unit at a specific timing as the threshold value.

In this configuration, the controller takes the load of the motor detected by the load detection unit at a specific timing as the threshold value. Namely, the threshold value is not a fixed value but a value that is updated, thereby all but eliminating error resulting from factors relating to the usage environment, such as the age of the device, temperature, or humidity, and enabling more appropriate processing results to be obtained.

Configuration may be made wherein the specific timing is a timing when at least the feed roller is not transporting the medium.

In this configuration, the specific timing is a timing when at least the feed roller is not transporting the medium, thereby enabling a more appropriate threshold value to be obtained.

Configuration may be made wherein the controller acquires the threshold value for each job executed.

In this configuration, the threshold value is acquired for each job executed. Acquiring the threshold value at a timing close to that of the medium processing performed by the processor enables a more appropriate threshold value to be obtained, and therefore enables more appropriate processing results to be obtained.

Configuration may be made wherein the controller sets a masking period in which determination is not made as to whether or not the load of the motor exceeds the threshold value for a specific period from when drive of the motor is started in which the sub gear switches from the disengaged state to the meshed state.

The torque required to rotate the main gear is very small during the interval in which the sub gear is switching from the disengaged state to the meshed state, and sometimes large fluctuations in the load of the motor arise during this interval. Were the threshold value to be strictly applied during this a period, there is a possibility that the sub gear might be falsely detected as having switched to the meshed state, despite not having switched to the meshed state.

However, in the above configuration, regardless of whether or not the load of the motor exceeds the threshold value, the controller sets the masking period for the specific period from the start of drive of the motor in which the sub gear switches from the disengaged state to the meshed state. This thereby enables false detection such as that described above to be suppressed.

Configuration may be made wherein the feed roller is provided upstream of the processor, and the control performed when the sub gear has switched from the disengaged state to the meshed state includes at least positioning control in which the feed roller is driven to position a medium leading edge position with respect to the processor at a start of processing in the processor.

In the above configuration, the feed roller is provided upstream of the processor. The control performed when the sub gear has switched from the disengaged state to the meshed state includes at least positioning control in which the feed roller is driven to position a medium leading edge position with respect to the processor at a start of processing in the processor. The medium leading edge position when the processor starts processing is therefore more accurate, enabling even better processing results to be obtained.

Configuration may be made further including at least a first drive amount and a second drive amount as drive amounts of the feed roller in the positioning control. Configuration may moreover be made wherein the controller applies the second drive amount in cases in which determination was made that the load of the motor exceeded the threshold value based on a predetermined condition during execution of the positioning control, and the controller applies the first drive amount in cases in which determination was made that the load of the motor has not exceeded the threshold value based on the predetermined condition during execution of the positioning control.

In the above configuration, processing is continued with the first drive amount applied, without interrupting the job with an error, even in cases in which the load of the motor does not exceed the threshold value based on the predetermined condition. Appropriate processing results may thereby be expected.

In the above configuration, configuration may be made wherein the motive force switching unit includes a gear support member and a second gear. The gear support member rotatably supports a first gear that meshes with the main gear and moves in planetary motion around the main gear, and the sub gear, and is capable of swinging coaxially with the main gear. The second gear meshes with the motive force transmission gear and meshes with the first gear accompanying swinging of the gear support member. Moreover, configuration may be made wherein by switching a direction in which the gear support member swings according to switching of a rotation direction of the motor, the motive force switching unit is capable of adopting a first motive force transmission state and a second motive force transmission state. In the first motive force transmission state, the sub gear meshes with the motive force transmission gear. In the second motive force transmission state, the first gear meshes with the second gear and transmits motive force to the motive force transmission gear via the second gear.

This configuration enables the operation and advantageous effects of any of the foregoing configurations to be obtained in a configuration in which, by switching the direction in which the gear support member swings according to switching of the rotation direction of the motor, the motive force switching unit is capable of adopting the first motive force transmission state in which the sub gear meshes with the motive force transmission gear, and the second motive force transmission state in which the first gear meshes with the second gear and transmits motive force to the motive force transmission gear via the second gear.

Configuration may be made wherein the processor is a reader unit that reads a face of the medium.

This configuration enables the operation and advantageous effects of any of the foregoing configurations to be obtained in a configuration in which the processor is a reader unit that reads a face of the medium.

BRIEF DESCRIPTION OF THE DRAWINGS

The disclosure will be described with reference to the accompanying drawings, wherein like numbers reference like elements.

FIG. 11 is a graph illustrating an example of changes in drive current values (duty values) in a drive motor.

DESCRIPTION OF EXEMPLARY EMBODIMENTS

Figure 1:
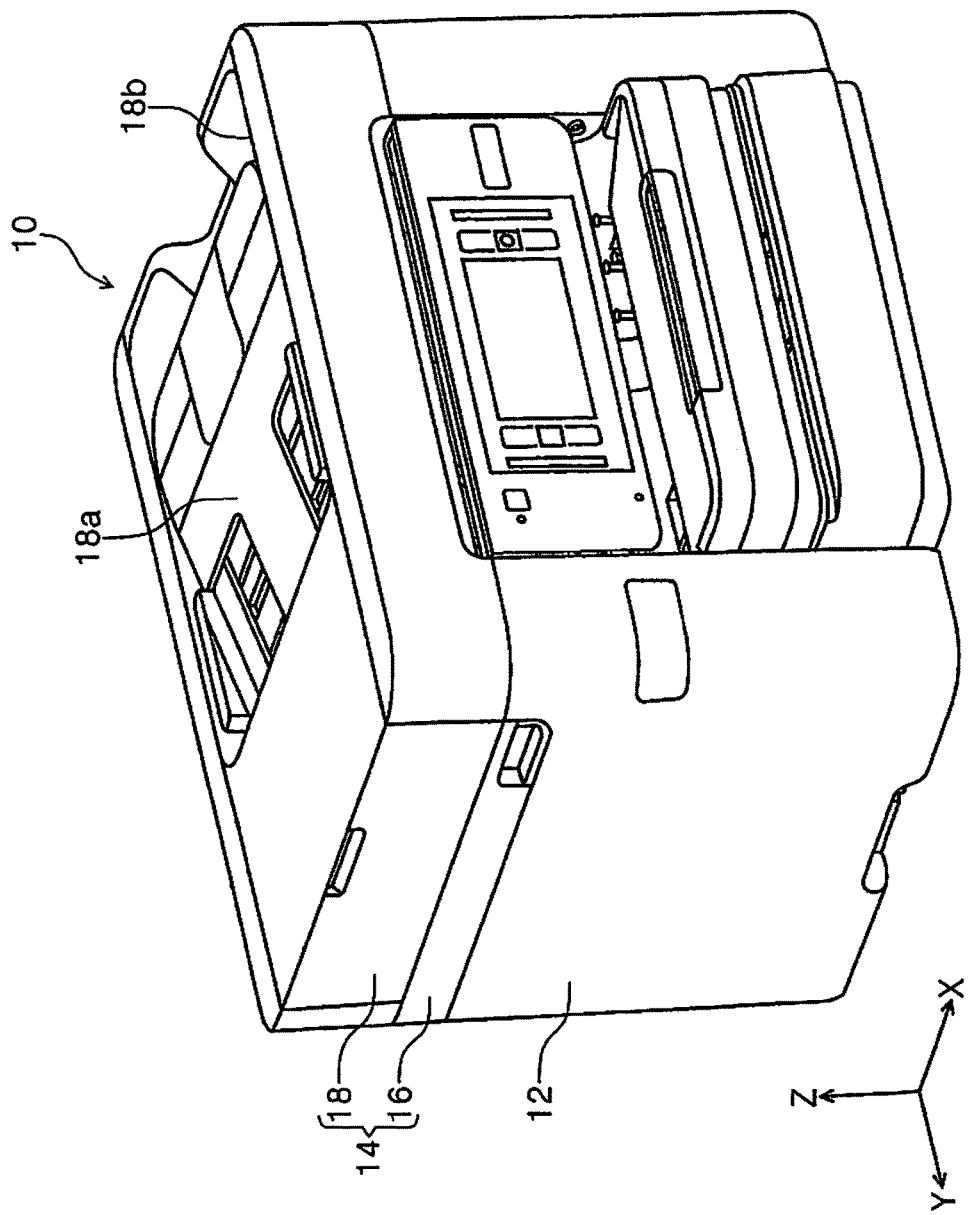
FIG. 1 is an external perspective view of a printer according to the disclosure.

Explanation follows regarding embodiments of the disclosure, with reference to the drawings. Note that the same configurations in the respective embodiments are allocated the same reference numerals, and described only in the first embodiment. Description of such configurations is omitted in subsequent embodiments.

Figure 2:
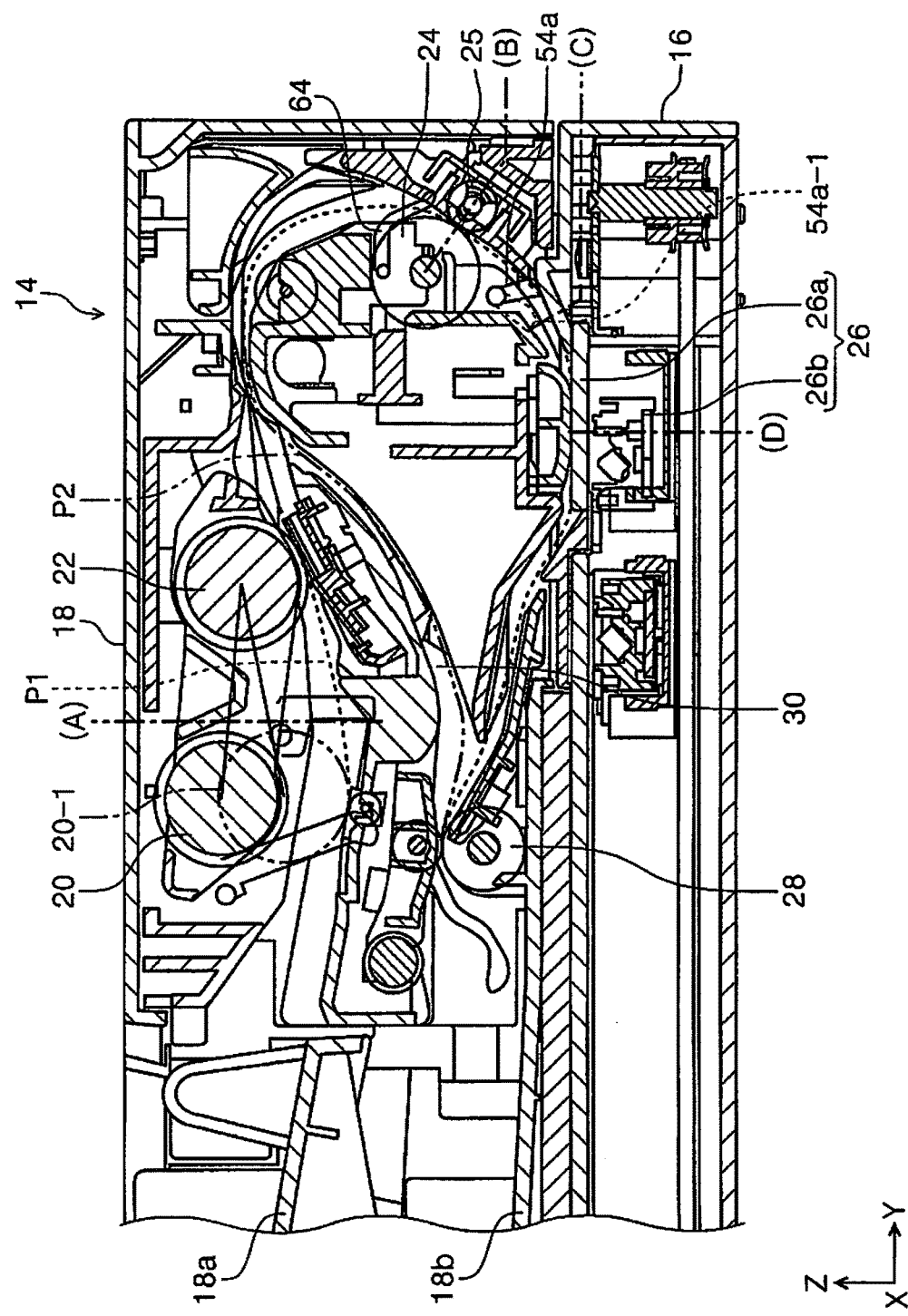
FIG. 2 is a side view cross-section illustrating a medium transport path in a medium processing device according to the disclosure.
Figure 3:
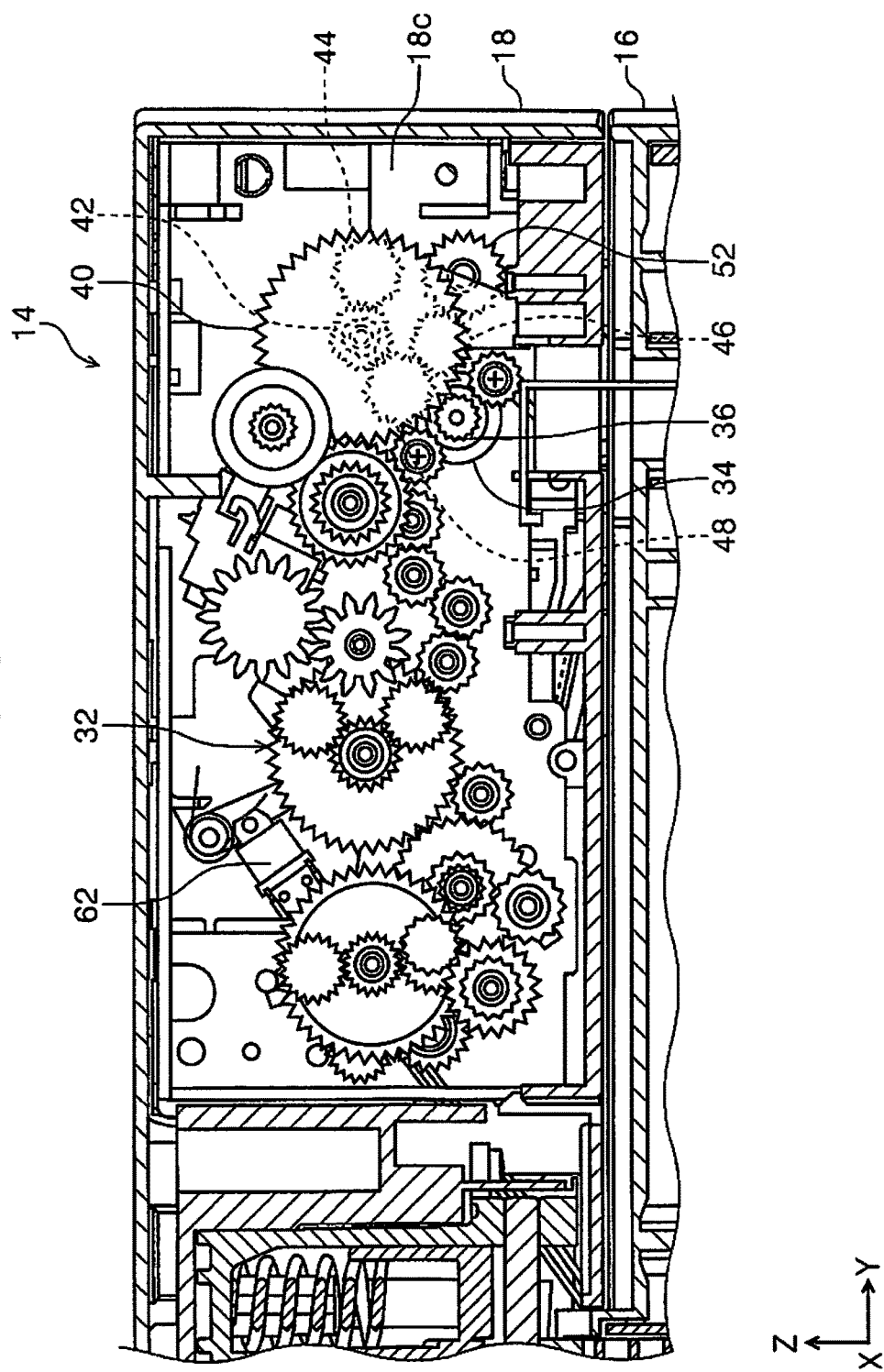
FIG. 3 is a front view illustrating a motive force transmission unit in a medium processing device according to the disclosure.
Figure 4:
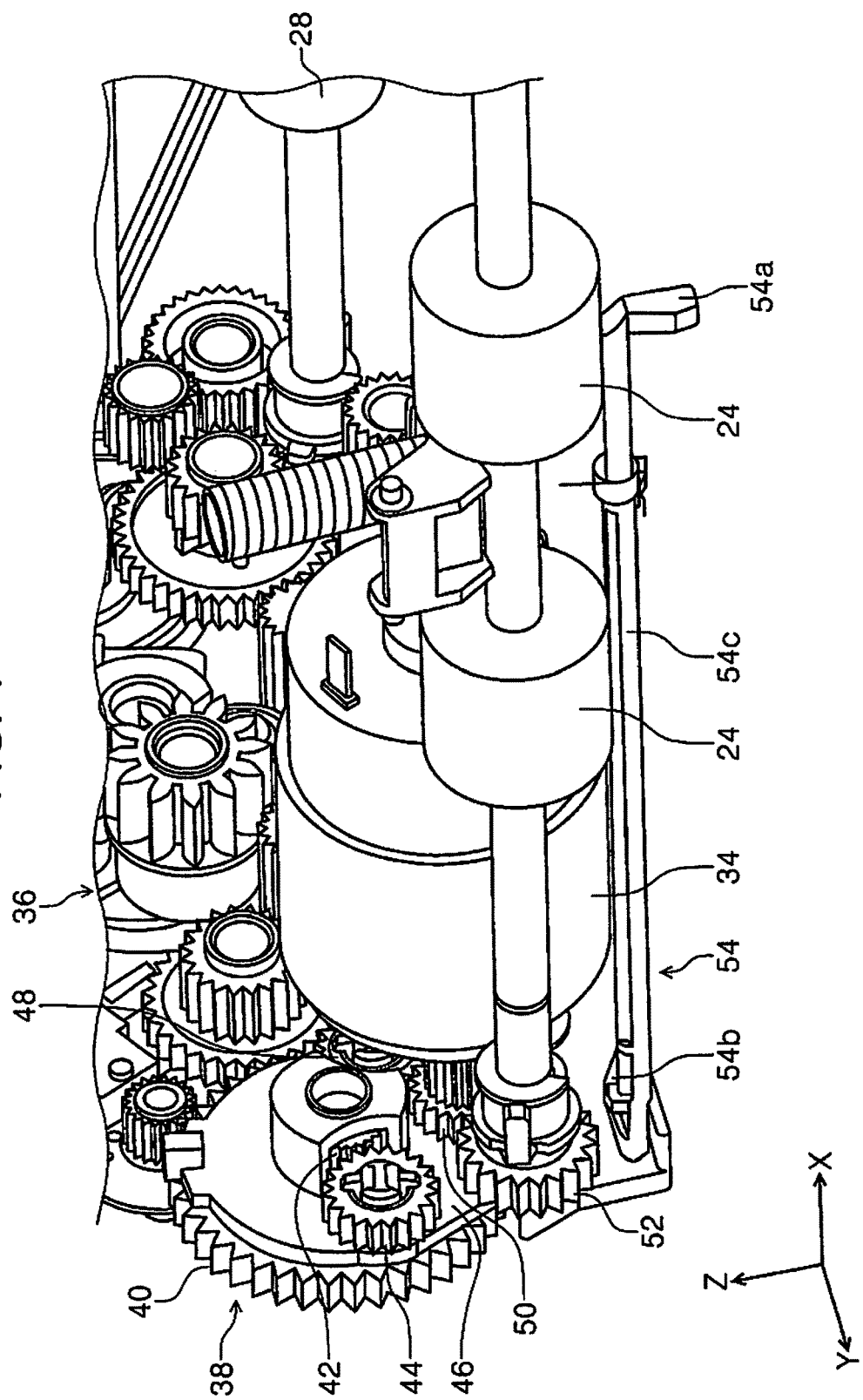
FIG. 4 is a perspective view illustrating a main gear, a sub gear, a gear support member, and a motive force switching unit in the motive force transmission unit.
Figure 5:
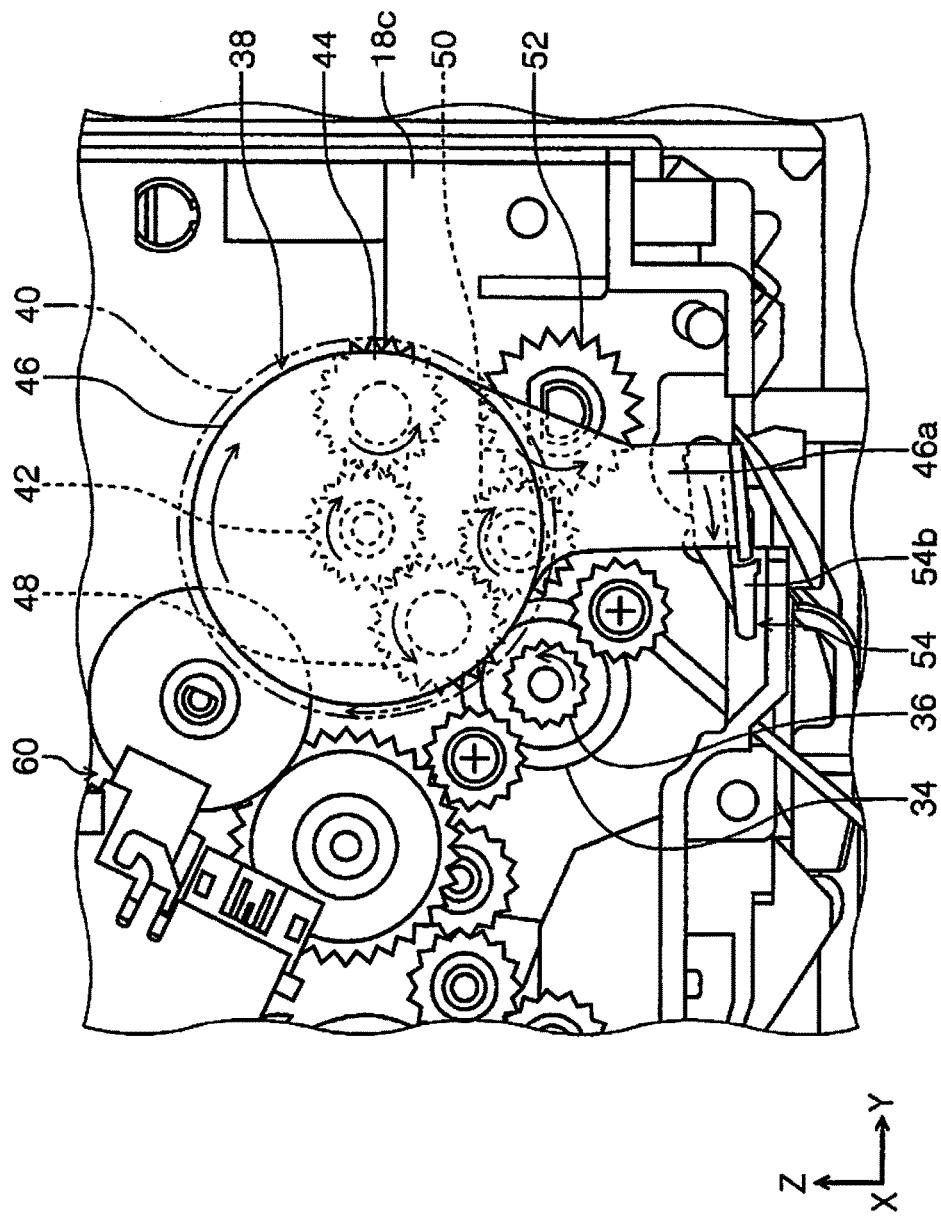
FIG. 5 is a diagram illustrating a disengaged state between a motive force transmission gear and the sub gear in the motive force switching unit.
Figure 6:
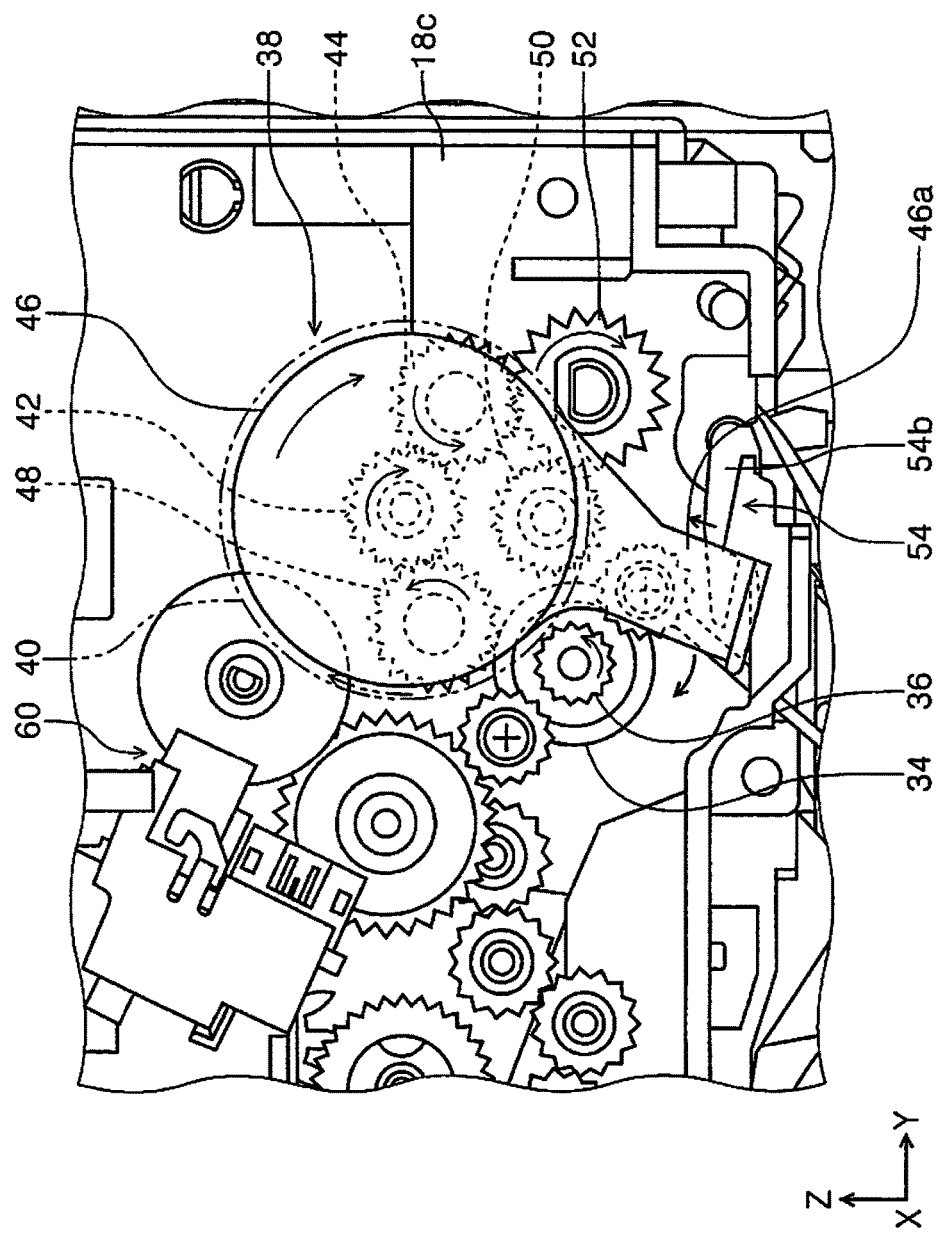
FIG. 6 is a diagram illustrating a meshed state between the motive force transmission gear and the sub gear in the motive force switching unit.

FIG. 1 is an external perspective view of a printer according to the disclosure. FIG. 2 is a side view cross-section illustrating a medium transport path in a medium processing device according to the disclosure. FIG. 3 is a front view illustrating a motive force transmission unit in a medium processing device according to the disclosure. FIG. 4 is a perspective view illustrating a main gear, a sub gear, a gear support member, and a motive force switching unit in the motive force transmission unit. FIG. 5 is a diagram illustrating a disengaged state between a motive force transmission gear and the sub gear in the motive force switching unit. FIG. 6 is a diagram illustrating a meshed state between the motive force transmission gear and the sub gear in the motive force switching unit.

Figure 7:
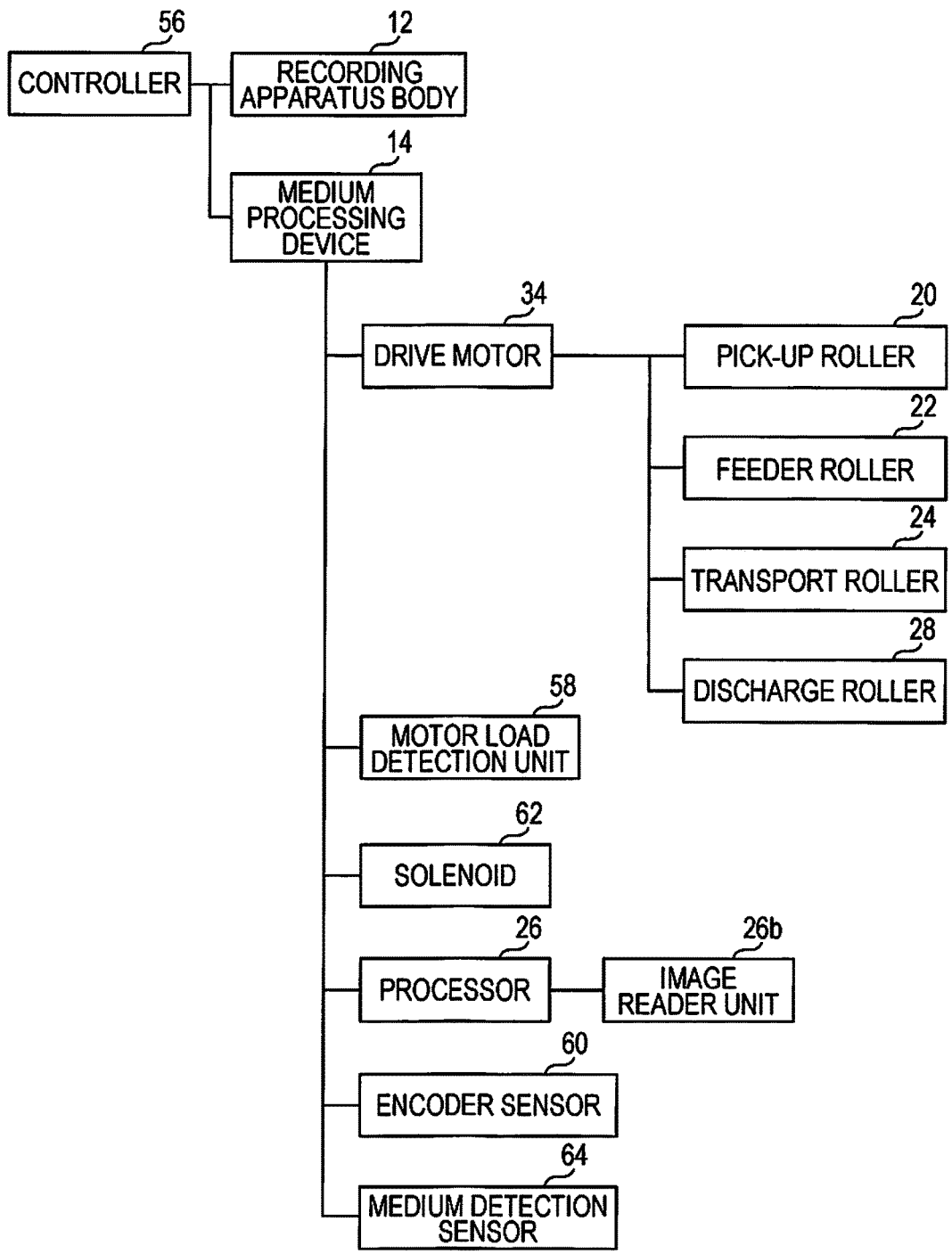
FIG. 7 is a block diagram illustrating the medium processing device.
Figure 8:
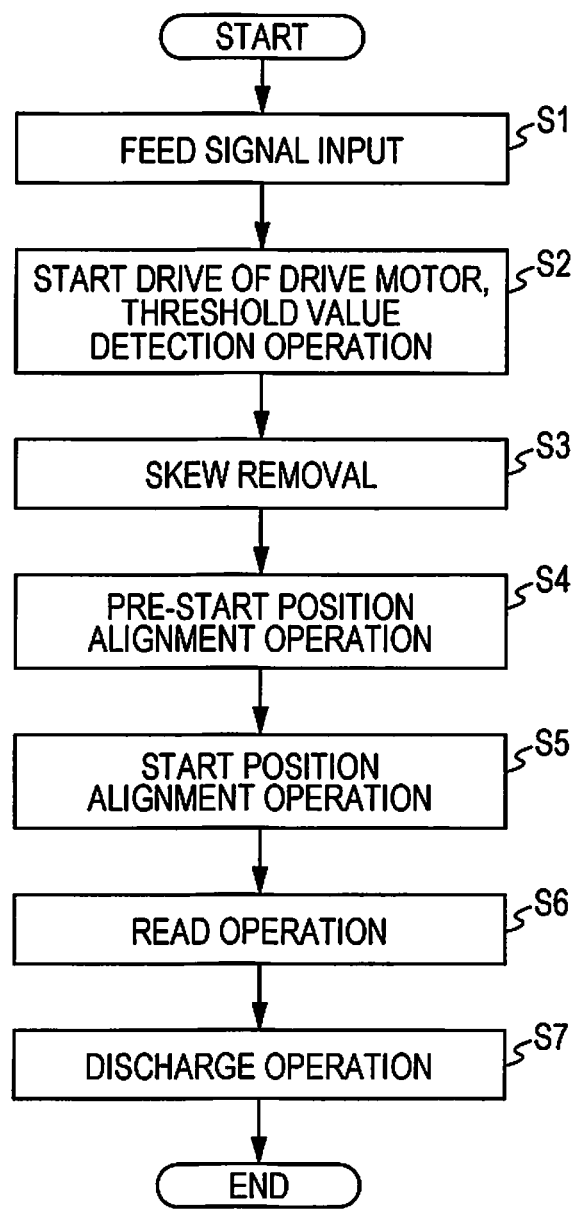
FIG. 8 is a flowchart illustrating medium transportation control in the medium processing device.
Figure 9:
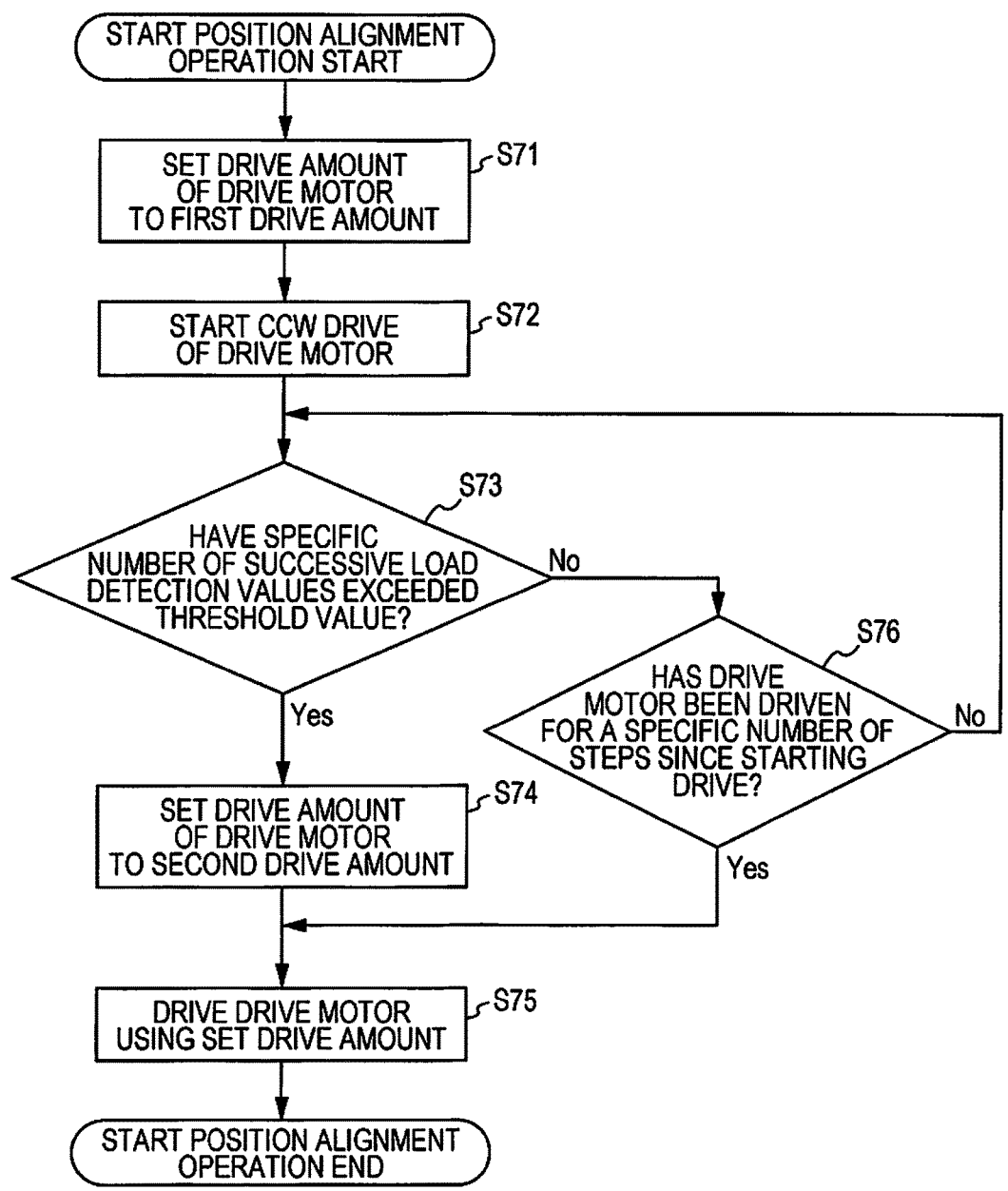
FIG. 9 is a flowchart illustrating a start position alignment operation.
Figure 10:
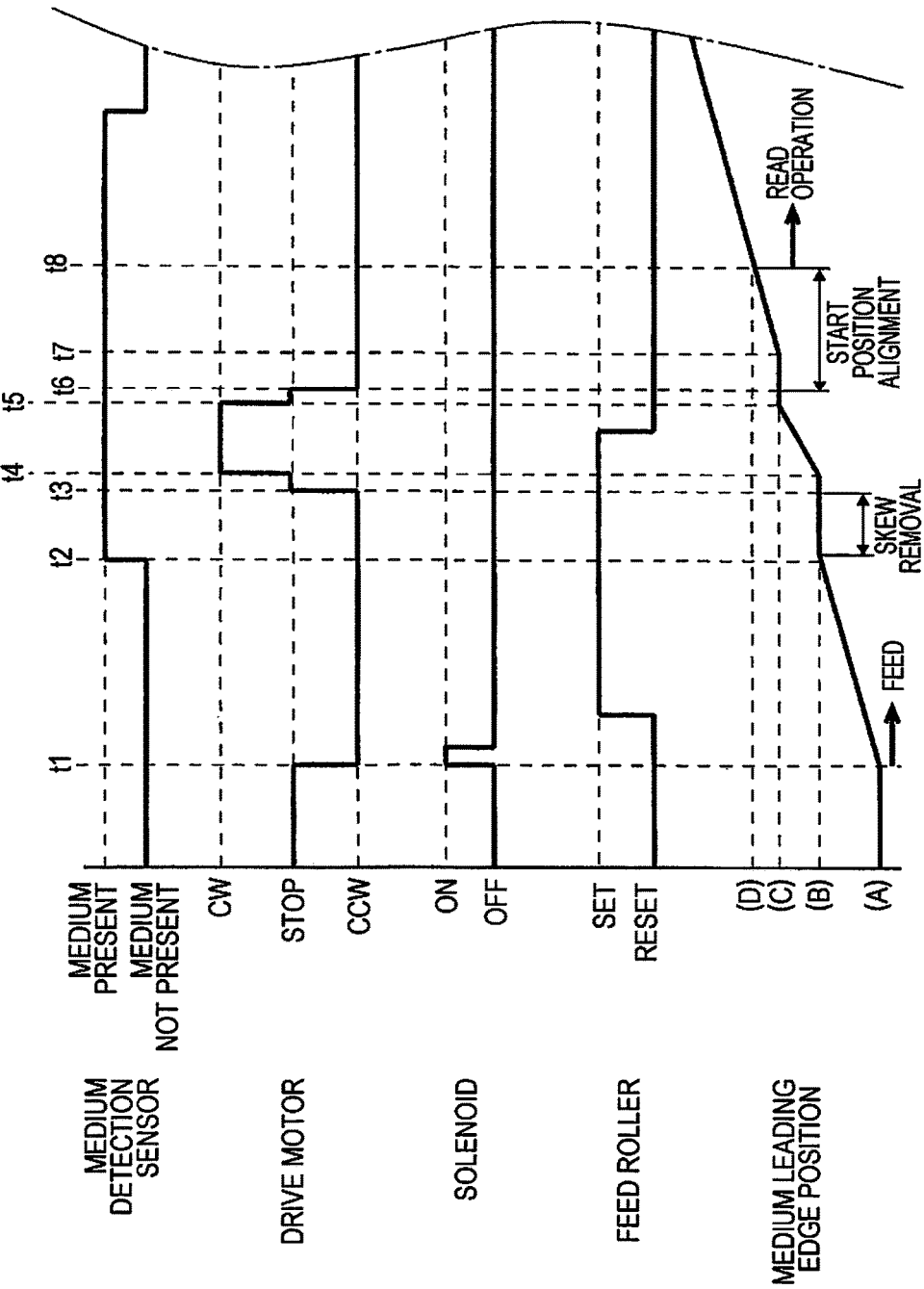
FIG. 10 is a timing chart for medium transportation in the medium processing device.

FIG. 7 is a block diagram illustrating the medium processing device. FIG. 8 is a flowchart illustrating medium transportation control in the medium processing device. FIG. 9 is a flowchart illustrating a start position alignment operation. FIG. 10 is a timing chart for medium transportation in the medium processing device. FIG. 11 is a graph illustrating an example of changes in drive current values (duty values) in a drive motor. Note that the graph at the bottom in FIG. 11 is an enlargement of the circled region in the graph at the top in FIG. 11.

In each of the drawings, in an X-Y-Z coordinate system, the X direction represents the width direction of a medium, namely a device depth direction. The Y direction represents a transport direction of a medium along a transport path inside the device, namely a device width direction. The Z direction represents a device height direction.

A printer 10 illustrated in FIG. 1 is configured as an ink jet printer, serving as an example of a recording apparatus. The printer 10 is configured as a multifunction device including a recording apparatus body 12 and a medium processing device (scanner) 14.

First, explanation is given regarding configuration of the medium processing device 14 illustrated in FIG. 1 to FIG. 7, followed by explanation regarding control performed during a medium read operation of the disclosure, illustrated in FIG. 8 to FIG. 11. The medium processing device 14 illustrated in FIG. 1 is disposed above the recording apparatus body 12. The medium processing device 14 includes, for example, a scanner body 16 that reads an image, and an Auto Document Feeder (ADF) 18. The ADF 18 includes a medium support tray 18a on which a medium is set, and a medium discharge tray 18b.

Explanation follows regarding the transport path of the medium in the medium processing device 14 illustrated in FIG. 2. Note that in FIG. 2, the dashed line labeled P1 indicates the path of a medium that has been fed out to a feed direction downstream side from the medium support tray 18a of the ADF 18. The double-dotted dashed line labeled P2 indicates the path of a medium in a double-sided path used when reading both faces of the medium in the ADF 18.

In FIG. 2, a pick-up roller 20, a feeder roller 22, a transport roller 24 serving as a feed roller, a processor 26, and a discharge roller 28 are disposed in sequence on the feed direction downstream side of the medium support tray 18a. A following roller 25 is disposed at a position facing the transport roller 24 so as to be capable of rotating following the transport roller 24. The processor 26 is configured as a reader that reads a face of a medium, and includes a reading section 26a and an image reader unit 26b. Note that in FIG. 2, the double-dotted dashed line labeled 20-1 indicates the state of the pick-up roller when in a feeding state.

A medium that has been set on the medium support tray 18a is fed downstream by the pick-up roller 20, the feeder roller 22, and the transport roller 24 in sequence, thereby reaching the processor 26. When the medium passes the reading section 26a, a face of the medium is read by the image reader unit 26b. The medium that has been read by the processor 26 is then discharged onto the medium discharge tray 18b by the discharge roller 28. Note that in order to read a second face of the medium after a first face of the medium has been read, after a trailing edge of the medium has been fed as far as the discharge roller 28, the discharge roller 28 is rotated in reverse such that the trailing edge of the medium becomes the leading edge side, and the medium is fed into a double-sided path 30. The medium that has been fed into the double-sided path 30 is nipped between the transport roller 24 and the following roller 25 and fed into the processor 26 again, and the second face (on the opposite side to the first face) of the medium is read. The medium is then discharged onto the medium discharge tray 18b by the discharge roller 28.

FIG. 3 illustrates a motive force transmission unit 32. The motive force transmission unit 32 is configured to transmit motive force from a drive gear 36 attached to a drive shaft of a drive motor 34, serving as a motor, through plural gears to the pick-up roller 20, the feeder roller 22, the transport roller 24, and the discharge roller 28.

The motive force transmission unit 32 is provided with a motive force switching unit 38 (FIG. 4 to FIG. 6). The motive force switching unit 38 illustrated in FIG. 3 to FIG. 6 includes a driven gear 40, a main gear 42, a sub gear 44, a gear support member 46, a first gear 48, a second gear 50, and a motive force transmission gear 52. The driven gear 40 and the main gear 42 are configured as a single unit, and are configured so as to rotate coaxially and in the same direction as each other.

The gear support member 46 is provided so as to be capable of swinging coaxially with the main gear 42 and the driven gear 40, and the gear support member 46 is configured so as to be capable of swinging relative to the main gear 42 and the driven gear 40. A friction member, not illustrated in the drawings, is provided between the driven gear 40 and the gear support member 46, and is configured such that rotation torque of the driven gear 40 is transmitted to the gear support member 46 through the friction member.

The gear support member 46 is provided with a locked portion 46a. The sub gear 44 and the first gear 48 are rotatably supported on the gear support member 46. Note that the sub gear 44 and the first gear 48 are both meshed with the main gear 42, and are configured as planetary gears that move in planetary motion around the main gear 42. The second gear 50 is, for example, rotatably supported on a frame 18c of the ADF 18, and is meshed with the motive force transmission gear 52.

When the drive motor 34 in FIG. 5 is rotated in a CCW direction (the counterclockwise direction in FIG. 5), the driven gear 40 (illustrated by double-dotted dashed lines in FIG. 5) and the main gear 42 rotate in a clockwise direction, the sub gear 44 and the first gear 48 acting as planetary gears rotate in the counterclockwise direction, and the gear support member 46 rotates in a clockwise direction, this being the same rotation direction as that of the main gear 42. Accordingly, the first gear 48 and the second gear 50 attempt to disengage from each other. However, since the locked portion 46a of the gear support member 46 is locked by a locking unit 54, described later, the gear support member 46 is restricted from swinging. As a result, the first gear 48 is maintained in a state meshed with the second gear 50, regardless of the rotation direction of the drive motor 34. Motive force of the drive motor 34 is thereby transmitted to the motive force transmission gear 52 via the first gear 48 and the second gear 50. Note that this state in which the first gear 48 transmits motive force to the motive force transmission gear 52 via the second gear 50 configures a second motive force transmission state of the motive force switching unit 38.

The rotation directions illustrated by arrows for the respective gears in FIG. 5 are the rotation directions of the respective gears when the drive motor 34 rotates in the CCW direction in the second motive force transmission state.

When the drive motor 34 rotates in the CCW direction (the counterclockwise direction in FIG. 5) in this manner, the motive force transmission gear 52 also rotates in the counterclockwise direction in FIG. 5. Since the motive force transmission gear 52 is provided at the end of a shaft of the transport roller 24, when the drive motor 34 rotates in the CCW direction, the transport roller 24 is rotated by the motive force transmission gear 52 in a direction to return the medium upstream.

Conversely, when the drive motor 34 rotates in a CW direction (the clockwise direction in FIG. 5), the motive force transmission gear 52 rotates in the clockwise direction in FIG. 5. As a result, the transport roller 24 is rotated by the motive force transmission gear 52 in a direction to transport the medium downstream.

On the other hand, in a state in which the locked state of the locked portion 46a by the locking unit 54 illustrated in FIG. 5 has been released, when the drive motor 34 is rotated in the CCW direction (the counterclockwise direction in FIG. 5), the first gear 48 disengages from the second gear 50 and the gear support member 46 swings in the clockwise direction, resulting in the state illustrated in FIG. 6. The sub gear 44 therefore meshes with the motive force transmission gear 52. As a result, motive force of the drive motor 34 is transmitted to the motive force transmission gear 52 via the sub gear 44. Note that this state in which the sub gear 44 transmits motive force to the motive force transmission gear 52 configures a first motive force transmission state of the motive force switching unit 38.

The rotation directions illustrated by arrows for the respective gears in FIG. 6 are the rotation directions of the respective gears when the drive motor 34 rotates in the CCW direction when in the first motive force transmission state.

The motive force transmission unit 32 is provided with the locking unit 54 (FIG. 4 to FIG. 6) that restricts the motive force switching unit 38 from switching between the first motive force transmission state and the second motive force transmission state. The locking unit 54 illustrated in FIG. 4 includes a lever 54a, a lock 54b, and a connector 54c connecting the lever 54a and the lock 54b together. As illustrated in FIG. 2, the lever 54a is positioned between the transport roller 24 and the processor 26 on the medium transport path, and is disposed so as to project toward the transport path. The lever 54a illustrated by solid lines in FIG. 2 is in an orientation that blocks the transport path. When a medium is transported to the position of the lever 54a, the lever 54a is pressed toward the transport direction downstream side by the medium and swings to the position of the lever 54a-1 illustrated by dashed lines.

The lock 54b illustrated in FIG. 5 engages with the locked portion 46a of the gear support member 46. In this state, the lock 54b restricts (locks) swinging of the gear support member 46, thereby maintaining the motive force switching unit 38 in the second motive force transmission state. Note that the locked state of the gear support member 46 by the lock 54b is attained when the lever 54a is in a state not contacting the medium on the medium transport path.

Next, when the medium is transported along the transport path illustrated in FIG. 2 as far as the position where the lever 54a is provided, the lever 54a is contacted by the medium and pressed such that the lever 54a swings to the position of the lever 54a-1 illustrated by dashed lines. The lock 54b accordingly also swings in the same direction as the lever 54a (FIG. 6). As a result, the engaged state (locked state) between the lock 54b and the locked portion 46a is released, allowing the gear support member 46 to swing in the clockwise direction in FIG. 6. The motive force switching unit 38 is thus capable of switching from the second motive force transmission state (FIG. 5) to the first motive force transmission state (FIG. 6).

Next, explanation follows regarding a control system of the printer 10, with reference to FIG. 7. A controller 56, serving as a control unit, controls rotation of the pick-up roller 20, the feeder roller 22, the transport roller 24, and the discharge roller 28 by the drive motor 34. Moreover, the controller 56 also detects load applied to the drive motor 34 using a motor load detection unit 58, serving as a load detection unit. Note that the load detected by the motor load detection unit 58 is a value that fluctuates according to drive load of the drive motor 34, for example a current value or voltage value of the drive motor 34. In the present embodiment, a duty value (duty value used in PWM control) computed from a current value and a voltage value is used as an example.

The controller 56 also controls a solenoid 62 provided to the motive force transmission unit 32, and receives detection signals from an encoder sensor 60 and a medium detection sensor 64. The controller 56 ascertains a rotation amount, rotation direction, and the like of the drive motor 34 based on detection information (pulse signals) from the encoder sensor 60, and performs control as required. The solenoid 62 is a unit used to switch the pick-up roller 20 between a feed orientation where the pick-up roller 20 contacts the medium in order to feed the medium, and a non-feed orientation where the pick-up roller 20 is separated from the medium. The controller 56 switches the solenoid 62 between an ON state and an OFF state in order to switch the pick-up roller 20 between the feed orientation and the non-feed orientation. The medium detection sensor 64 illustrated in FIG. 2 is disposed upstream of the transport roller 24 in the medium transport path. A signal state of the medium detection sensor 64 changes when the medium detection sensor 64 contacts the medium, enabling the controller 56 to ascertain the passage of the medium.

Next, explanation follows regarding an issue arising in an operation to align a start position of a source document with a read start position, with reference to FIG. 10 and FIG. 11.

Note that medium leading edge positions (A) to (D) in FIG. 10 correspond to the positions labeled with the same reference numerals in FIG. 2. Specifically, the medium leading edge position (A) is the medium leading edge position when the medium has been set on the medium support tray 18a and is in a state capable of being fed. The medium leading edge position (B) is the medium leading edge position when the leading edge of the medium has reached the transport roller 24. The medium leading edge position (C) is the medium leading edge position when the leading edge of the medium has swung the lever 54a of the locking unit 54. The medium leading edge position (D) is the medium leading edge position when the processor 26 has started reading the medium.

First, explanation follows regarding an overall flow from feed-in of the medium until reading starts, with reference to FIG. 10.

The controller 56 starts drive of the drive motor 34 in the CCW direction, and switches the solenoid 62 (FIG. 7) ON, thereby switching the pick-up roller 20 (FIG. 2) to the feed orientation and starting feed of the medium (timing t1 in FIG. 10).

When this is performed, the state of the motive force switching unit 38 is the second motive force transmission state illustrated in FIG. 5, such that due to the CCW rotation of the drive motor 34, the transport roller 24 rotates in a reverse direction which would return the medium upstream.

As feed of the medium continues, the leading edge of the medium is detected by the medium detection sensor 64 (FIG. 2) ahead of the transport roller 24 (FIG. 2) (timing t2 in FIG. 10). Although the leading edge of the medium reaches the transport roller 24, since the transport roller 24 is rotating in the reverse direction to return the medium upstream at this time, the leading edge of the medium goes no further than the transport roller 24, thereby eliminating skew.

After performing a skew-removal operation for a specific duration (the "skew removal" period illustrated in FIG. 10), the controller 56 stops the drive motor 34 (timing t3 in FIG. 10), switches the rotation direction to the CW direction, and then restarts drive of the drive motor 34 (timing t4 in FIG. 10).

Due to switching the rotation direction of the drive motor 34 to the CW direction so as to change the rotation direction of the transport roller 24 to a forward rotation direction to feed the medium downstream, the leading edge of the medium is nipped between the transport roller 24 and the following roller 25 (FIG. 2), and advances downstream.

After the leading edge of the medium has advanced downstream from the nipping position between the transport roller 24 and the following roller 25 (position (B) in FIG. 2), the leading edge of the medium reaches position (C) in FIG. 2, namely the position of the lever 54*a*, and pushes up the lever 54*a* (as indicated by 54*a*-1 in FIG. 2).

The locked state of the gear support member 46 by the locking unit 54 illustrated in FIG. 5 is thereby released (between timings t4 and t5 in FIG. 10).

After briefly stopping the drive motor 34, the controller 56 restarts drive of the drive motor 34 in the CCW direction (timing t6 in FIG. 10). Note that the control of the motor at the respective timings t3, t4, t5, and t6 in FIG. 10 is executed with reference to drive amounts (predetermined drive amounts) of the drive motor 34 from the timing when the leading edge of the medium was detected by the medium detection sensor 64 (timing t2 in FIG. 10).

Note that when drive of the drive motor 34 in the CCW direction is started at timing t6 in FIG. 10, rotation of the transport roller 24 does not begin immediately. Namely, as illustrated by the change from FIG. 5 to FIG. 6, this is since motive force is not transmitted to the motive force transmission gear 52 during an interval in which the gear support member 46 swings in the clockwise direction in FIG. 5 and the sub gear 44 meshes with the motive force transmission gear 52, namely during an interval in which the motive force switching unit 38 switches from the second motive force transmission state (FIG. 5) to the first motive force transmission state (FIG. 6). Hereafter, this duration will be referred to as the "planetary switching duration". The planetary switching duration corresponds to the duration from timing t6 to timing t7 in FIG. 10.

Note that since motive force is not transmitted to the motive force transmission gear 52 during the planetary switching duration, transportation of the medium stops, as illustrated by the duration from timing t6 to timing t7 in FIG. 10.

Were the controller 56 then to determine that the leading edge of the medium had reached the read start position (position (D) in FIG. 2) at the point that the drive motor 34 had rotated by a specific step since starting CCW direction drive of the drive motor 34 (at timing t6 in FIG. 10) and start a reading operation by the reading section 26*a* (FIG. 2) (timing t8 in FIG. 10), the following issue would arise.

Specifically, for example, if the planetary switching duration were to take longer than that anticipated by design, an issue would arise whereby a blank area is formed at the beginning of the read results.

Such deviation in the planetary switching duration may arise as a result of an inappropriate meshing action between the sub gear 44 (FIG. 6) and the motive force transmission gear 52 (FIG. 6), this being an action that defines the end of the planetary switching duration.

More specifically, this occurs when tooth ends of teeth on both gears abut and slip against each other and do not mesh quickly when the sub gear 44 meshes with the motive force transmission gear 52 due to the gear support member 46 swinging.

The controller 56 according to the present embodiment switches the drive amount of the drive motor 34 on a case-by-case basis to form a start position alignment duration between starting drive of the drive motor 34 in the CCW direction (timing t6 in FIG. 10) and starting the read operation (timing t8 in FIG. 10).

In simple terms, when the sub gear 44 has meshed with the motive force transmission gear 52 due to the gear support member 46 swinging, the drive load of the drive motor 34 increases. This is due to switching from a state in which drive force is not being transmitted to a state in which drive force is being transmitted (moreover, a state in which the medium is being transported).

The controller 56 therefore utilizes this behavior to set a timing at which the drive motor 34 has rotated by the specific step after an increase in drive load of the drive motor 34 has been detected as a start timing for the read operation (timing t8 in FIG. 10).

The increase in the drive load of the drive motor 34 is determined based on whether or not the drive load of the drive motor 34 has exceeded a threshold value that has been found in advance.

Further explanation follows regarding this processing, with reference to FIG. 8, FIG. 9, and FIG. 11.

At step S1 in FIG. 8, the medium is set on the medium support tray 18*a*, and a feed signal is input to the controller 56. At step S2, the controller 56, having received the feed signal, starts rotation drive of the drive motor 34 in the CCW direction (timing t1 in FIG. 10), and then performs a threshold value detection operation.

The pick-up roller 20 (FIG. 2) is not in contact with the medium immediately after starting drive of the drive motor 34, and is in a non-feeding state. The respective driven components (the pick-up roller 20, the transport roller 24, and the discharge roller 28) spin but do not transport the medium. Accordingly, only a very small load acts on the drive motor 34 in comparison to a state in which the medium is being transported by the respective driven components.

In the upper part of FIG. 11, the time 0 corresponds to the timing t1 in FIG. 10, and the period Tx is the duration in which the drive motor 34 is being driven with a small load as described above.

In this state, the controller 56 acquires the drive load of the drive motor 34 and sets this drive load as a threshold value used later. In this state, the drive load of the drive motor 34 is in a state close to that during the planetary switching duration.

In this manner, the controller 56 sets a threshold value T (FIG. 11) based on the load detected by the motor load detection unit 58.

Note that this threshold value detection is preferably only performed on the first occasion in cases in which plural sheets of the medium are fed and read in succession. This is since at feed start timings for the second sheet of the medium onwards, sheets of the medium that have been fed previously still remain inside the transport path, such that a comparatively large load is acting on the drive motor 34. Appropriate threshold value detection may therefore be unachievable.

Next, at step S3 in FIG. 8, the controller 56 performs skew removal on the leading edge of the medium (the "skew removal" period illustrated in FIG. 10), and then performs a pre-start position alignment operation at step S4.

The pre-start position alignment operation is an operation performed between timings t4 and t6 in FIG. 10, and is an operation to feed the leading edge of the medium from the position (B) to the vicinity of position (C) (just ahead of the position (C)) in FIG. 2. The locked state (FIG. 5) of the motive force transmission unit 32 (FIG. 5) by the locking unit 54 is released during the pre-start position alignment operation.

Next, the controller 56 executes the start position alignment operation at step S5. The contents of the start position alignment operation of step S5 are illustrated in FIG. 9.

As illustrated in FIG. 9, the controller 56 sets the drive amount (feed amount) of the transport roller 24 to a first drive amount at step S71. Details of the first drive amount will be explained later.

Next, the controller 56 switches the rotation direction of the drive motor 34 from the CW direction to the CCW direction, and starts drive of the drive motor 34 at step S72 (timing t6 in FIG. 10).

This timing corresponds to the start timing of the planetary switching duration, and at this timing, the controller 56 begins monitoring whether or not the drive load of the drive motor 34 has exceeded the threshold value T.

When a specific number of successive detection values for the drive load of the drive motor 34 (for example, 200 successive detection values in the present embodiment) have exceeded the threshold value T (step S73=YES), the sub gear 44 is determined to have meshed with the motive force transmission gear 52 (note that the detection values are obtained at specific time intervals. For example, the detection values are obtained every 200 μsec in the present embodiment). The provisionally set first drive amount (step S71) of the drive motor 34 is abandoned, and a second drive amount is set as the drive amount of the drive motor 34 (step S74). The drive motor 34 is then driven using the set drive amount (step S75).

Note that at step S73, rather than simply determining whether or not one detection value of the drive load of the drive motor 34 has exceeded the threshold value, determination is made as to whether or not the detection values of the drive load of the drive motor 34 have exceeded the threshold value on the specific number of successive occasions, in order to prevent false detection as a result of detecting a sudden spurt in the drive load.

Note that the first drive amount is a drive amount of the drive motor 34 required in order to advance the leading edge of the medium approximately from the position (C) to the position (D) in FIG. 2, and the first drive amount also includes the drive amount of the drive motor 34 during the planetary switching duration (note that this is a drive amount based on the design). Accordingly, if the planetary switching duration deviates as described above, the amount by which the medium is transported will obviously also deviate as a result. As a result, for example, there are cases in which the leading edge of the medium is not transported from the position (C) to the position (D) in FIG. 2 even when the drive motor 34 is driven by the first drive amount.

The second drive amount is also a drive amount of the drive motor 34 required to advance the leading edge of the medium approximately from the position (C) to the position (D) in FIG. 2. However, the second drive amount does not include the drive load of the drive motor 34 during the planetary switching duration.

Namely, the second drive amount is a smaller amount than the first drive amount, and since the drive amount of the drive motor 34 during the planetary switching duration is not included, when the drive motor 34 is driven using the second drive amount, it is almost certain that the medium will only be transported by the expected amount. Namely, the leading edge of the medium is reliably fed from the position (C) to the position (D).

Note that the lower part of FIG. 11 illustrates when the first drive amount and the second drive amount are applied during the start position alignment operation.

In cases in which, for example, an appropriate threshold value could not be detected, sometimes the drive load of the drive motor 34 does not exceed the threshold value even when the sub gear 44 has meshed with the motive force transmission gear 52 (even when the motive force switching unit 38 has switched from the second motive force transmission state (FIG. 5) to the first motive force transmission state (FIG. 6)). In order to avoid such issues, in cases in which the drive load of the drive motor 34 does not exceed the threshold value (step S73=NO), and the drive motor 34 has been driven for a specific number of steps since drive of the drive motor 34 was started (step S76=YES), the first drive amount set at step S71 is maintained, and the drive motor 34 is driven using the first drive amount (step S75).

Note that the specific number of steps at step S76 is a number of steps set based on detection values detected by the encoder sensor 60 provided to the motive force transmission unit 32. For example, in the present embodiment, a rotation amount of the drive motor 34 in which the gear support member 46 swings from the state illustrated in FIG. 5 to the state illustrated in FIG. 6, plus the equivalent of the sub gear 44 rotating by two teeth with respect to the motive force transmission gear 52, is set as the specific number of steps.

Note that in the present embodiment, a specific period from the point in time when CCW direction drive of the drive motor 34 is started (t6 in FIG. 10), namely from the point in time when monitoring of the drive load of the drive motor 34 starts, is set as a masking period (the period Tm in the lower part of FIG. 11). The controller 56 does not make determination as to whether or not the detection values for the drive load of the drive motor 34 have exceeded the threshold value T during the masking period Tm. This is since in PWM control, the drive current value may overshoot immediately after starting drive of the drive motor 34, which could give rise to the possibility of false detection were the drive current value to be monitored during this period.

Note that after the start of CCW direction drive of the drive motor 34 (from t6 onward in FIG. 10), the solenoid 62 is in the OFF state, and the pick-up roller 20 is in the non-feeding state.

Returning to FIG. 8, when the medium start position alignment operation has been completed by the process outlined above, the medium read operation is performed (step S6), and a medium discharge operation is performed (step S7).

In the present embodiment, when plural sheets of the medium are fed in succession in the medium processing device 14, the skew-removal operation (step S3), the pre-start position alignment operation (step S4), and the start position alignment operation (step S5) illustrated in FIG. 8 are omitted for the second sheet onward (however, a normal start position alignment operation is performed), and the read operation is executed successively by the processor 26. Note that in cases in which plural sheets of the medium are fed in succession, for the second sheet onward, setting is made such that the first motive force transmission state of the motive force transmission unit 32 is maintained until the series of feed operations has ended. As a result, when feeding plural sheets of the medium, the operation routine from step S3 to step S5 need not be performed for each sheet of the medium, enabling a reduction in the time taken for a feed job.

In the present embodiment, as illustrated in the upper part of FIG. 11, the threshold value detection operation is performed utilizing part of the feed operation period, thereby enabling an improvement in throughput in comparison to cases in which the threshold value detection operation is performed on its own.

Moreover, in the present embodiment, the threshold value detection operation is set to be performed for every medium feed job executed. Accordingly, since the threshold value is set for each feed job, the leading edge of the medium can be positioned more accurately at the read start position of the processor 26, avoiding the influence of overall fluctuations in the load of the drive motor 34 as a result of external factors (heating of the drive motor, age-related deterioration of the device) or the like.

Modified Example of the Embodiment

In the present embodiment, the disclosure is applied to a configuration used to switch the motive force of the transport roller 24. However, there is no limitation thereto, and the disclosure may be applied to a configuration to switch the motive force of another roller, or may be applied to a configuration to switch the motive force of a roller used to feed or transport the medium provided inside the recording apparatus body 12. Moreover, for example, the disclosure may be applied to a configuration to switch the motive force of a component other than a roller, such as a carriage inside the recording apparatus body 12 or a pump used to suck out waste ink.

To summarize the foregoing explanation, the medium processing device 14 is configured including the processor 26, the transport roller 24, the drive motor 34, the motive force transmission gear 52, the motive force switching unit 38, the motor load detection unit 58, and the controller 56. The processor 26 performs processing on a medium. The transport roller 24 feeds the medium. The drive motor 34 is a drive source of the transport roller 24. The motive force transmission gear 52 is one gear to transmit motive force of the drive motor 34 to the transport roller 24. The motive force switching unit 38 is configured including the main gear 42 driven by the drive motor 34 and the sub gear 44 that meshes with the main gear 42 and moves in planetary motion around the main gear 42, and is configured capable of switching accompanying rotation direction switching of the main gear 42 between a meshed state in which the sub gear 44 is meshed with the motive force transmission gear 52 and a disengaged state in which the sub gear 44 is disengaged from the motive force transmission gear 52. The motor load detection unit 58 detects load of the drive motor 34. The controller 56 controls the drive motor 34 and the processor 26. The controller 56 controls the drive motor 34 and the processor 26 according to load of the drive motor 34 detected by the motor load detection unit 58 at switching of the sub gear 44 from the disengaged state to the meshed state.

In the configuration described above, the controller 56 determines the meshed state of the sub gear 44 with the motive force transmission gear 52 to be present according to the load of the drive motor 34, and controls the drive motor 34 and the processor 26 based on this determination. The present embodiment thereby enables appropriate processing results to be obtained due to performing control based on the meshing of the gears, for example based on detecting the load of the drive motor in the present embodiment, even in cases in which meshing of the gears (meshing between the sub gear 44 and the motive force transmission gear 52) is not performed smoothly when the sub gear 44 switches from the disengaged state to the meshed state.

Note that in the embodiment described above, both the drive motor 34 and the processor 26 are controlled according to the load of the drive motor 34. However, depending on the configuration, configuration may be made in which at least one out of the drive motor 34 or the processor 26 is controlled according to the load of the drive motor 34.

The present embodiment further includes the threshold value T for the load of the drive motor 34, and the controller 56 transitions to control performed when the sub gear 44 has switched to the meshed state (start position alignment control in the present embodiment) based on the load of the drive motor 34 having exceeded the threshold value T.

This configuration includes the threshold value T for load of the drive motor 34 that is based on, for example, a current value, a voltage value, or a value (duty) computed from the current value and the voltage value, of the drive motor 34. The controller 56 transitions to the control performed once the sub gear 44 has switched to the meshed state based on the load of the drive motor 34 having exceeded the threshold value T. This thereby enables appropriate processing results to be obtained due to assessing the load of the drive motor 34 more appropriately.

In the present embodiment, the controller 56 takes the load of the drive motor 34 detected by the motor load detection unit 58 at a specific timing as the threshold value T. In this configuration, in the present embodiment, the controller 56 takes the load of the drive motor 34 detected by the motor load detection unit 58 at the specific timing, this being immediately after starting drive of the drive motor 34 on receiving the feed signal, as the threshold value T. Namely, the threshold value T is not a fixed value but a value that is updated with each feed job, thereby all but eliminating error resulting from factors relating to the usage environment, such as the age of the device, temperature, or humidity, and enabling more appropriate processing results to be obtained.

Moreover, in the present embodiment, the specific timing is a timing when at least the transport roller 24 is not transporting the medium. This configuration enables the load acting on the drive motor 34 to be detected when the load is in a state closer to that of the load when the sub gear 44 switches from the disengaged state to the meshed state, and thereby enables a more appropriate threshold value T to be obtained.

The controller 56 acquires the threshold value T for each job executed. In this configuration, since the threshold value T is acquired each time a medium feed job is executed, a more appropriate threshold value T can be obtained for each feed job since the threshold value T is acquired at a timing close to that of the medium processing performed by the processor 26. This thereby enables more appropriate processing results to be obtained.

In the present embodiment, the controller 56 sets the masking period Tm in which determination is not made as to whether or not the load of the drive motor 34 exceeds the threshold value T for a specific period from when drive of the drive motor 34 is started in which the sub gear 44 switches from the disengaged state to the meshed state.

The torque required to rotate the main gear 42 is very small during the interval in which the sub gear 44 is switching from the disengaged state to the meshed state, and sometimes large fluctuations in the load of the drive motor 34 arise during this interval. Were the threshold value T to be strictly applied during this period, there is a possibility that the sub gear 44 might be falsely detected as having switched to the meshed state, despite not having switched to the meshed state. However, in the above configuration, the controller 56 sets the masking period Tm in which determination is not made as to whether or not the load of the drive motor 34 exceeds the threshold value T for the specific period from the start of drive of the drive motor 34 in which the sub gear 44 switches from the disengaged state to the meshed state. This thereby enables the sub gear 44 to be suppressed from being falsely detected as having switched to the meshed state despite not having switched.

The transport roller 24 is provided upstream of the processor 26, and the control performed when the sub gear 44 has switched from the disengaged state to the meshed state includes at least positioning control in which the transport roller 24 is driven to position the medium leading edge position (D) with respect to the processor 26 at a start of processing in the processor 26.

According to this configuration, the transport roller 24 is provided upstream of the processor 26, and the control performed when the sub gear 44 has switched from the disengaged state to the meshed state includes at least the positioning control (start position alignment control) in which the transport roller 24 is driven to position the medium leading edge position (D) with respect to the processor 26 when the processor 26 starts medium read processing. The medium leading edge position when the processor 26 starts medium read processing is therefore more accurate, enabling even better processing results to be obtained.

Moreover, the present embodiment includes at least the first drive amount and the second drive amount as drive amounts of the transport roller 24 in the start position alignment control. The controller 56 applies the second drive amount in cases in which determination was made that the load of the drive motor 34 exceeded the threshold value T based on a predetermined condition during execution of the start position alignment control, and the controller 56 applies the first drive amount in cases in which determination was made that the load of the drive motor 34 has not exceeded the threshold value T based on the predetermined condition during execution of the positioning control.

According to the above configuration, the medium read processing by the processor 26 is continued with the first drive amount applied, without interrupting the job with an error, even in cases in which the load of the drive motor 34 does not exceed the threshold value T. Appropriate processing results may thereby be expected.

Moreover, in the present embodiment, the motive force switching unit 38 includes the gear support member 46 and the second gear 50. The gear support member 46 rotatably supports the first gear 48 that meshes with the main gear 42 and moves in planetary motion around the main gear 42, and the sub gear 44, and that is capable of swinging coaxially with the main gear 42. The second gear 50 meshes with the motive force transmission gear 52 and meshes with the first gear 48 accompanying swinging of the gear support member 46. By switching the direction in which the gear support member 46 swings according to switching of the rotation direction of the drive motor 34, the motive force switching unit 38 is capable of adopting the first motive force transmission state and the second motive force transmission state. In the first motive force transmission state the sub gear 44 meshes with the motive force transmission gear 52. In the second motive force transmission state, the first gear 48 meshes with the second gear 50 and transmits motive force to the motive force transmission gear 52 via the second gear 50.

The processor 26 is a reader unit that reads a face of the medium. Specifically, the processor 26 is configured as an image reader (scanner) including, for example, the reading section 26a and the image reader unit 26b.

Note that the disclosure is not limited to the above embodiment, and obviously various modifications are possible within the scope of the disclosure as recited in the claims, and any such modifications are included in the scope of the disclosure.

What is claimed is:

1. A medium processing device comprising:
   a processor that performs processing on a medium;
   a feed roller that has a shaft and feeds the medium to the processor;
   an electric motor that is a drive source of the feed roller;
   a motive force transmission gear that is disposed at an end of the shaft of the feed roller and that is one gear to transmit motive force of the electric motor to the feed roller;
   a motive force switch that includes a main gear driven by the electric motor and a sub gear that meshes with the main gear and moves in planetary motion around the main gear, and that is configured to switch accompanying rotation direction switching of the main gear between a meshed state in which the sub gear is meshed with the motive force transmission gear and a disengaged state in which the sub gear is disengaged from the motive force transmission gear;
   an electronic load detector that detects load of the electric motor; and
   an electronic controller that controls the electric motor and the processor, the electronic controller controlling at least one out of the electric motor or the processor according to the load of the electric motor detected by the electronic load detector at switching of the sub gear from the disengaged state to the meshed state,
   the electronic controller transitioning to control performed when the sub gear has switched to the meshed state, at, as a starting point, a timing when the electronic controller determines that the load of the electric motor has exceeded a threshold value.

2. The medium processing device according to claim 1, wherein the electronic controller takes the load of the electric motor detected by the electronic load detector at a specific timing as the threshold value.

3. The medium processing device according to claim 2, wherein the specific timing is a timing when at least the feed roller is not transporting the medium.

4. The medium processing device according to claim 2, wherein the electronic controller acquires the threshold value for each job executed.

5. The medium processing device according to claim 1, wherein the electronic controller sets a masking period in which determination is not made as to whether or not the load of the electric motor exceeds the threshold value for a specific period from when drive of the electric motor is started in which the sub gear switches from the disengaged state to the meshed state.

6. The medium processing device according to claim 1, wherein:
   the feed roller is provided upstream of the processor; and
   the control performed when the sub gear has switched from the disengaged state to the meshed state includes at least positioning control in which the feed roller is driven to position a medium leading edge position with respect to the processor at a start of processing in the processor.

7. The medium processing device according to claim 6, further comprising at least a first drive amount and a second drive amount as drive amounts of the feed roller in the positioning control, wherein:

the electronic controller applies the second drive amount in cases in which determination was made that the load of the electric motor exceeded the threshold value based on a predetermined condition during execution of the positioning control; and the electronic controller applies the first drive amount in cases in which determination was made that the load of the electric motor has not exceeded the threshold value based on the predetermined condition during execution of the positioning control.

8. The medium processing device of claim 1, wherein:
the motive force switch includes
gear supporter to which a first gear, which meshes with the main gear and moves in planetary motion around the main gear, and the sub gear are rotatably coupled, the gear supporter being configured to swing coaxially with the main gear, and
a second gear that meshes with the motive force transmission gear and that meshes with the first gear accompanying swinging of the gear supporter; and,
by switching a direction in which the gear supporter swings according to switching of a rotation direction of the electric motor, the motive force switch is configured to adopt
a first motive force transmission state in which the sub gear meshes with the motive force transmission gear, and
a second motive force transmission state in which the first gear meshes with the second gear and transmits motive force to the motive force transmission gear via the second gear.

9. The medium processing device according to claim 1, wherein the processor is a reader unit that reads a face of the medium.

10. A medium processing device comprising:
a processor that performs processing on a medium;
a feed roller that has a shaft and feeds the medium to the processor;
an electric motor that is a drive source of the feed roller;
a motive force transmission gear that is disposed at an end of the shaft of the feed roller and that is one gear to transmit motive force of the motor to the feed roller;
a motive force switch that includes a main gear driven by the electric motor and a sub gear that meshes with the main gear and moves in planetary motion around the main gear, and that is configured to switch accompanying rotation direction switching of the main gear between a meshed state in which the sub gear is meshed with the motive force transmission gear and a disengaged state in which the sub gear is disengaged from the motive force transmission gear;
an electronic load detector that detects load of the electric motor; and
an electronic controller that controls the electric motor and the processor, the electronic controller controlling at least one out of the electric motor or the processor according to the load of the electric motor detected by the electronic load detector at switching of the sub gear from the disengaged state to the meshed state,
the electronic controller acquiring, for each job executed, a threshold value of the load of the electric motor for determining that the sub gear has switched to the meshed state.

11. The medium processing device according to claim 10, wherein the electronic controller takes the load of the electric motor detected by the electronic load detector at a specific timing as the threshold value.

12. The medium processing device according to claim 10, wherein the specific timing is a timing when at least the feed roller is not transporting the medium.

* * * * *